United States Patent [19]

Beck et al.

[11] Patent Number: 5,030,260
[45] Date of Patent: Jul. 9, 1991

[54] DISK DRIVE BREATHER FILTER

[75] Inventors: John L. Beck, Rochester, Minn.; Charles A. Brown, San Jose, Calif.; Todd P. Fracek; Nigel F. Misso, both of Rochester, Minn.; Leo Volpe, Palo Alto; Herman R. Wendt, San Jose, both of Calif.; Thomas A. Gregory, Rochester, Minn.

[73] Assignee: International Business Machines Corporation, Armonk, N.Y.

[21] Appl. No.: 445,818

[22] Filed: Dec. 4, 1989

[51] Int. Cl.$^5$ .............................................. B01D 50/00
[52] U.S. Cl. ...................................... 55/316; 55/385.6; 55/387; 360/97.02; 360/97.03
[58] Field of Search ..................... 55/316, 385.6, 387; 360/97.02, 97.03

[56] References Cited

U.S. PATENT DOCUMENTS 4,826,513  5/1989  Stackhouse et al. ................... 55/387
4,863,499  9/1989  Osendorf ............................. 55/385.6

Primary Examiner—Bernard Nozick
Attorney, Agent, or Firm—Robert W. Lahtinen

[57] ABSTRACT

The magnetic disk drive chemical breather filter of the present invention affords protection with respect to chemical vapors and gases in addition to trapping particulate pollutants. The chemical filter as described, protects against both organic vapors and inorganic gases. In addition particulate filters are interposed between the chemical filters and both the exterior atmosphere and internal atmosphere. The combined filter is isolated from both external and internal atmosphere by extended length diffusion passages. Both difffusion passages are composed of multiple parallel paths to prevent the blockage of any single path from impairing the functioning of the filter. Chambers formed at each side of the combined filter medium and access thereto by the diffusion passages at the center of one chamber and the periphery of the other enables the length of the air passage through the filter medium to be equal irrespective of the portion of the filter through which the air flow passes. Using an activated carbon fabric chemical filter and coplanar multiple diffusion paths, a low profile, low cost filter assembly is achieved. The use of ultrasonic welding of the parts eliminates connector devices and adhesives as sources of contamination.

24 Claims, 5 Drawing Sheets

DISK DRIVE BREATHER FILTER

FIELD OF THE INVENTION

The invention is concerned with breather filters for electronic enclosures such as magnetic disk drives, which include chemical filtration capacity with particulate prefilter and final filter media, and are designed to make effective use of the entire chemical media filtering capacity, while protecting against overloading the chemical media from either the exterior or interior of the enclosure

BACKGROUND OF THE INVENTION

Thin film disks (TFD) in magnetic direct access storage devices (DASD) or rigid disk files require very smooth surfaces and low fly heights of the transducer carrying slider to achieve the progressively higher densities that these devices are being designed to attain. The necessity that these devices be contained within a predetermined form factor mandates that optimum utilization be made of available space.

Air is exchanged between the enclosure surrounding the head disk assembly and the atmosphere of the surrounding environment by diffusion and flow. These storage devices normally exchange some air with the surrounding environment even when there is no internal recirculating air stream. The head-disk enclosure is normally vented to the atmosphere and internally pressure balanced to prevent excess pressure and leaks which may allow contaminated air to enter the file. To prevent contamination, files are equipped with a breather filter to remove 99.99 percent of particles from the external atmosphere entering the file. Files will heat up during operation due to energy dissipation from the spindle motor and actuator as well as from air friction with the spinning disks. During this thermal cycling there will be an air exchange or "thermal pumping". Also there may be small leaks at the connections, gaskets, screw holes and the motors, which dictate that a proper design provide a pressure balance to allow a small flow in through the breather and out through any leak points during power-on.

Air contaminants dangerous for magnetic disk drives include many types of vapors. Heavy organics and organometallics are examples of undesirable substances. They include hydrocarbons, phthalates, adipates, fatty amines and phenols. Corrosive inorganic gases such as hydrogen chloride, hydrogen sulfide, sulfur dioxide, nitrogen oxides and ammonia can injure components in a head-disk assembly (HDA). Thin film disks used in current higher density storage devices are more susceptible to corrosion than prior particulate disks. In general, all reactive or adsorbing gases and vapors are potentially hazardous.

One important failure mechanism of magnetic disk drives is stiction, or static friction, which is adhesion of the heads to the disks while the file is stopped. Due to size constraints, the space available for drive motors is small and the motors have limited torque. High densities being achievable only with very smooth magnetic layers and very low fly heights, it is necessary that both disk and slider be very smooth. Such smooth surfaces are very susceptible to stiction resulting from the accumulation of organic materials on the surfaces. The lubricants used in these devices are present in very thin layers (on the order of a monomolecular layer). This makes the lubricant layer very susceptible to contamination by small amounts of material adsorbed on the surface. These adsorbed materials change the surface energy and the adhesive forces between the disk and slider. Vapors may also undergo capillary condensation in the gap between slider and disk. There is no way to predict what chemicals will be in the environment of a disk file. This is especially true in small files destined for small to medium sized computer systems which may not be used in the typical data processing environment.

A breather filter is subject to various design considerations. The filter must remove external particulate contamination from the air entering the file. The filter must prevent the entry of high molecular weight contaminants into the file and if corrosive gas protection is required, the filter must be capable of removing corrosive gases.

The filter must also meet certain criteria to be useful in compact storage devices. It must meet the functional performance requirements for the life of the file. The filter must be capable of fitting into design requirements of low end storage devices in which space is at a premium and where there are significant limitations on the location of the breather filter. The filter must remove a very large fraction of the external contaminants entering the file. Depending on the leak and thermal pumping rate, the required efficiency may exceed 99.5 percent. The filter must be low cost and readily manufacturable.

To obtain maximum life from the filter while maintaining low cost and small size, it is essential the the adsorber element contacts only the air actually entering the file. Chemical vapors in the vicinity of the filter element can diffuse into the active adsorbers and reduce capacity. Consequently, maximum filter life at minimum cost and size will require that the adsorbers be limited in exposure to external contaminants contained in the actual flow into the file. This requires that the adsorbers be protected by diffusion elements.

The prior art includes a breather filter in the May 1988 issue of *Research Disclosure* which uses a compact design, but does not include both a particulate prefilter and final filter in combination with a chemical filter, nor teach equalized flow distribution. U.S. Pat. No. 4,684,510 shows a disk drive filter device that uses a diffusion tube to communicate with the exterior atmospheric environment and incorporates chemical filtering capability, but does not teach the equalized flow distribution through the filter medium that would maximize effectiveness and the useful life, nor does it teach features to allow ultra-low profile.

SUMMARY OF THE INVENTION

The breather filter must not only protect the file enclosure from particulate contamination resident in the surrounding atmosphere, but must include chemical vapor protection as well. The filter design includes a particulate filter at each side of the chemical filter. The filter element closest to the interior of the HDA provides the ultimate protection of the HDA from particles. The filter element closest to the exterior of the HDA provides two functions: first, it traps chemical bearing particles (e.g. aerosols) and second, it extends the life of the very high efficiency inner filter element. The upstream particulate filter traps aerosols that could escape the chemical filter. Without the upstream particulate filter, an organic contaminant in aerosol form could pass through the carbon, chemical filter; be captured in the particulate final filter and thereafter diffuse into the enclosure. To prevent the combined filter medium from being subjected to excessive diffusion which would reduce filter life or require a large filtering capability, an extended diffusion path is provided between the filter medium and both the external atmosphere and the head-disk enclosure. In both cases multiple diffusion paths are provided to prevent blockage of any single path from impairing the function of the breather system. The flow path through the chemical filter is designed to use the full volume of the chemical filter medium. Flow which passes through a restricted portion would deplete the filtering capability of that portion while not utilizing the filtering capability of the portion of the medium outside the flow path. The chemical filter may be formed of multiple layers to include both organic and inorganic chemical filtering capabilities. An alternative is to treat a particulate filter to impart chemical filtering capabilities in addition to the ability to exclude particulate contamination.

The breather filter is secured to the enclosure cover using tape to provide a complete and permanent seal. Those portions of the filter assembly which are within the head-disk enclosure are secured to one another using ultrasonic welding to minimize the chance that the filter itself will become the source of particulate or organic contamination from adhesives, screws or other attachment devices.

DETAILED DESCRIPTION

Figure 1:
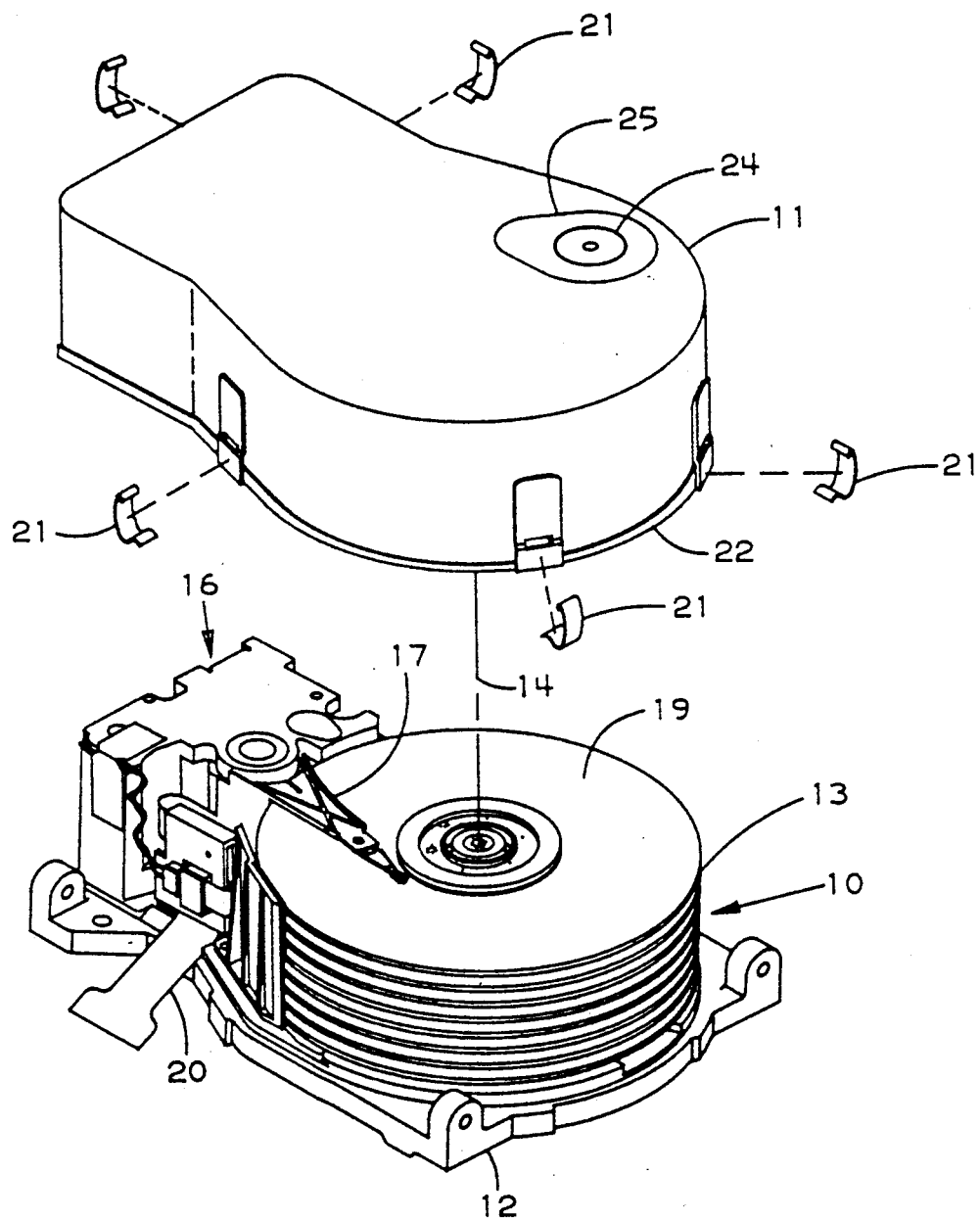
FIG. 1 shows a typical disk drive with the cover removed and including the chemical breather filter of tha present invention.

Any disk drive enclosure requires the exclusion of particulate materials which impair the cooperation between the transducer head and the disk data storage surface. Also necessary to enhance the useful life of the storage device is the control of vapor and gaseous contaminants.

The filter material must meet several requirements. It must be able to trap a variety of pollutants with diverse physical and chemical properties and must entrap them permanently. The material must not capture abundant air constituents such as water vapor and carbon dioxide. It must reserve its sorption capabilities for the harmful contaminants. A good filter has a high capacity, that is, amount of pollutant adsorbed per unit of filter weight and volume. Microporous solids with high specific pore volume satisfy this requirement best. In addition the material must possess a low flow impedance to avoid flow restriction and consequent air bypass. Finally, it must have both structure and geometry suitable to make a filter unit for the associated disk drive. Modern small HDA's can only accommodate small, low profile breather filters.

A typical disk file can be viewed as a partially sealed enclosure wherein the breather hole is the main aperture, and other, minor apertures are simply leaks at various uncontrolled locations. Through the apertures, air is exchanged between the enclosure and the ambient. All constituents of air including gaseous pollutants take part in the exchange. When the file operates, the spinning of the disks causes a pressure gradient in the enclosure. The pressure is lowest at the disk axis near which the breather is preferably located. At the disk periphery, where the leaks may be, the pressure is higher.

Air is exchanged between the enclosure and the ambiance primarily by diffusion and flow. Molecular diffusion is an "unforced" mode of mass transfer operating at all times. The rate depends mainly on the aperture dimensions. Thermal pumping is forced convection of air flowing to equalize the pressure when the temperature changes. If the file temperature rises relative to the ambient value, some air is expelled from the enclosure. Conversely, when the file temperature falls, some air is drawn in. It happens, for example, when the ambient temperature goes from daytime high to nighttime low or when the disk file is switched off and cools. Steady-state flow of air through leaks takes place in running files with two or more apertures due to internal pressure differences. Additional air exchange takes place as quick "puffs" caused by internal pressure redistribution upon switching the machine on or off. That mode of air exchange has a negligibly small contribution compared with the diffusion, thermal pumping and flow through leaks.

The unique adsorption properties of activated carbon render it the most suitable material for the filter. The carbon micropores can irreversibly trap a variety of harmful vapors in large quantities. The material holds large nonpolar molecules strongly and small polar molecules weakly and reversibly. Thus, it is an excellent filter material for heavy organic and organometallic pollutants. It has less affinity for corrosive gases. Given the relatively low levels of corrosives, however, activated carbon is expected to provide sufficient protection. Carbon is known among adsorbants for its low affinity for water. At high relative humidity water can fill the pores decreasing the effectiveness of filtration, but the sorption is fully reversible.

The activated carbon organic vapor filter must have several properties. It must be thin to afford a low profile filter assembly, must possess a high concentration of activated carbon, must provide minimal restriction to air flow and should not generate particles that would compromise the cleanliness of the enclosure or overload the particulate filter provided to protect the enclosed environment. One material that possesses these qualities is a spun and woven fabric that is essentially 100 percent activated carbon material with pores of a uniform size that is highly effective with respect to organic vapor adsorption. Being wholly activated carbon, the material can be effective in very thin fabric form, typically about 0.5 mm in thickness, which also possesses minimal restriction to air flow. Such a product is KYNOL activated carbon fabric available from American Kynol.

Other materials may be used as an alternative, such as activated carbon treated papers, felt or sponge materials impregnated with activated carbon. However, none of these materials, as presently available, achieves the desired filter properties to the degree attained by the activated carbon fabric filter media.

FIG. 1 is a view of a typical rigid disk magnetic data storage file 10 with the cover 11 removed. A base 12 supports a stack of axially spaced disks 13 which rotate in unison about a common axis 14. An actuator assembly 16 supports a series of transducer carrying arms 17 which access the data storage surfaces 19 of the disks 13. A flat cable 20 interconnects electronics contained within the head-disk enclosure with the drive circuit card outside the head-disk enclosure. The cover 11 is secured to base 12 by a series of clips 21 with the seal between cover and base effected by a gasket 22. The cover 11 includes the chemical breather assembly 24 of the present invention which is secured to the cover by an external tape element 25.

Figure 2:
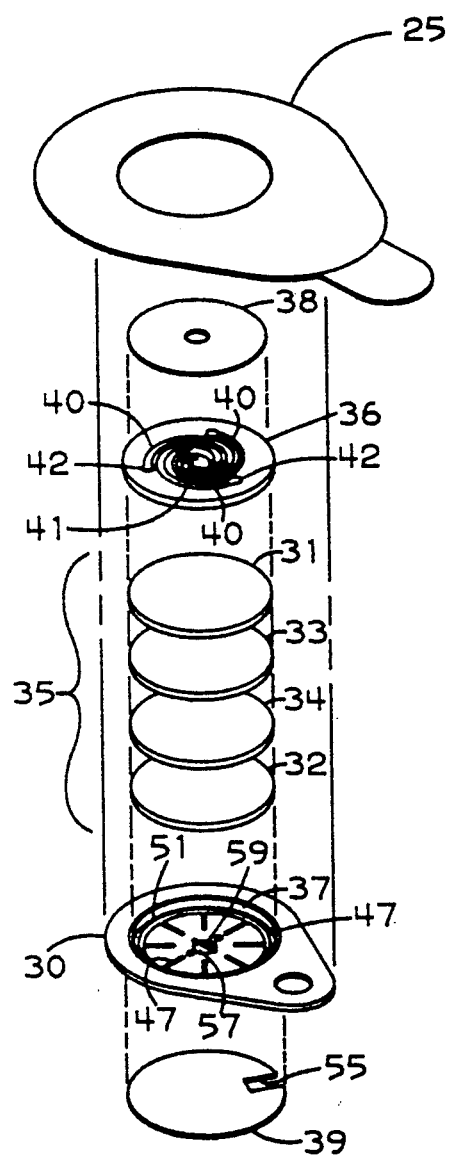
FIG. 2 is an exploded view of the chemical breather filter.

FIG. 2 shows the construction of the breather filter assembly 24 which meets the constraints of low profile, chemical and particulate exclusion capability and low cost manufacturability. The filter assembly of FIG. 2 as applied to the drive of FIG. 1 has a total height of the assembled package of approximately 4 mm. The filter assembly includes a bottom housing 30, a multiple layer filter medium 35 comprising a particulate media 31, 32 at each side and an intermediate chemical element or elements 33, 34 and a diffusion plate 36 that is received in a recess 37 in the lower housing 30 and attached thereto to retain the composite filter media 35. The assembly 24 includes a tape top 38 and a bottom cover 39 and is secured and sealed in position on a disk drive cover by an external tape 25.

The diffusion plate 36 includes three interleaved helical channels 40 extending from a central recess 41 to a series of three peripheral apertures 42 that extend through the plate to the lower side. The tape top 38 attaches to the upper surface to form a series of diffusion passages extending from the center recess 41 at one axial side of diffusion plate 36 to the three peripheral openings 42 that extend through to the opposite side of the diffusion plate. As seen in FIGS. 3 through 6, the lower surface of diffusion plate 36 has a rim 44 that forms a recess 45. The rounded projections 46 retain the filter media 35 to form a chamber 45 axially between the filter medium and diffusion plate surface 48. A rib 49 and projections 50 adjacent each of the three openings 42 prevent the filter material from restricting the opening.

Figure 8:
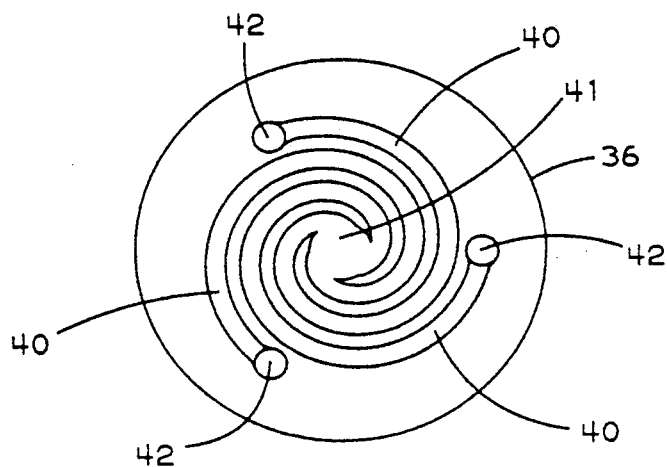
FIG. 8 is an enlarged plan view of the upper surface (as viewed in FIG. 2) of the diffusion plate.

The bottom housing 30 (FIG. 2 and the enlarged view of FIG. 8) has a cylindrical recess 37 in which the filter medium 35 is retained. The ribs 47 which define a surface coplanar with the surface 51 of the recess 37 to support the filter medium 35 above the axial end wall and form a chamber 56 the axial end of the filter. A central opening 57 communicates with the lower surface of housing 30. A rib 59 over center opening 57 maintains the chamber height at the central opening thus providing bridging support for the filter medium.

Figure 3:
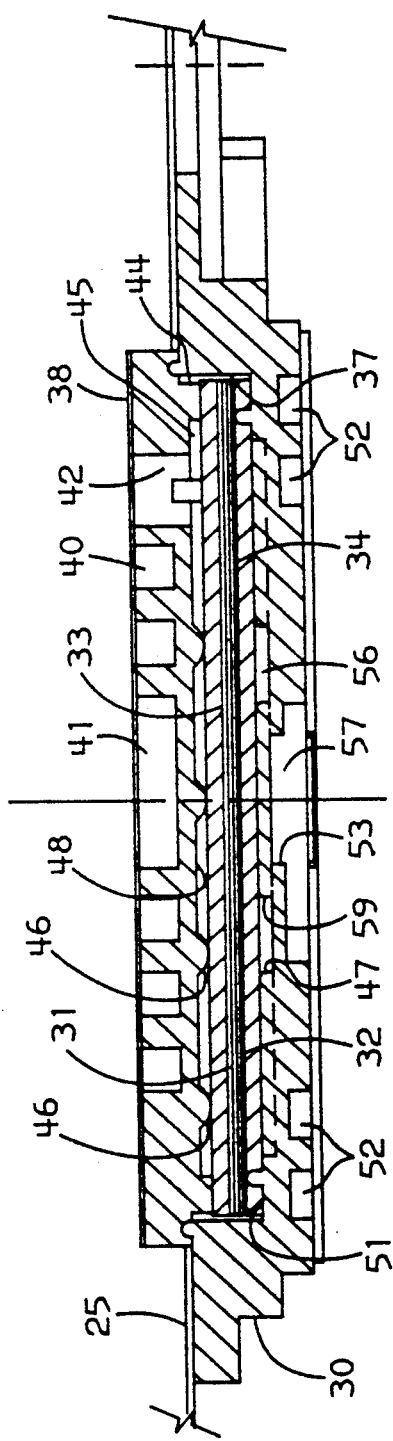
FIG. 3 is a vertical section view of the assembled breather filter of FIG. 2.
Figure 4:
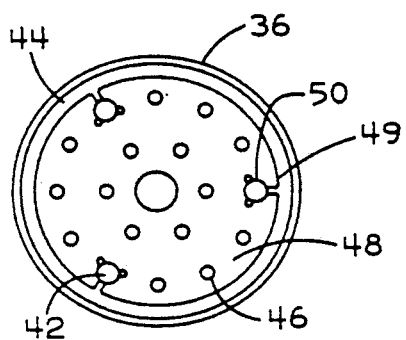
FIG. 4 is a bottom view of the diffusion plate of FIG. 2.
Figure 5:
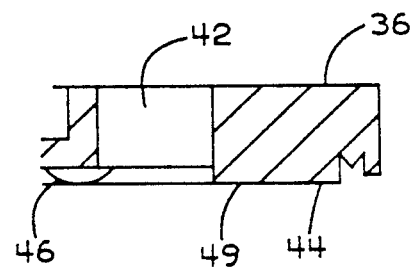
FIG. 5 is an enlarged vertical section.
Figure 6:
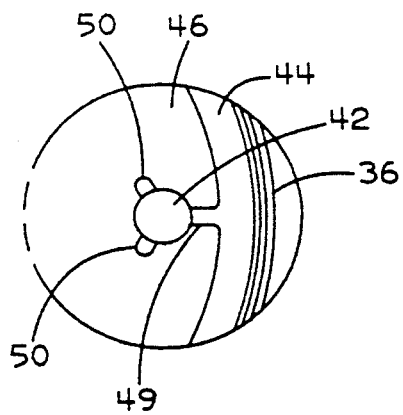
FIG. 6 is an enlarged view of a portion of diffusion plate of FIG. 4 showing the details at the peripheral opening.
Figure 7:
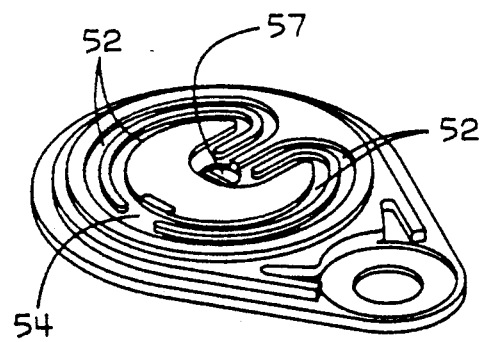
FIG. 7 is a perspective view of the lower surface of the bottom housing that is obscured in FIG. 2.
Figure 9:
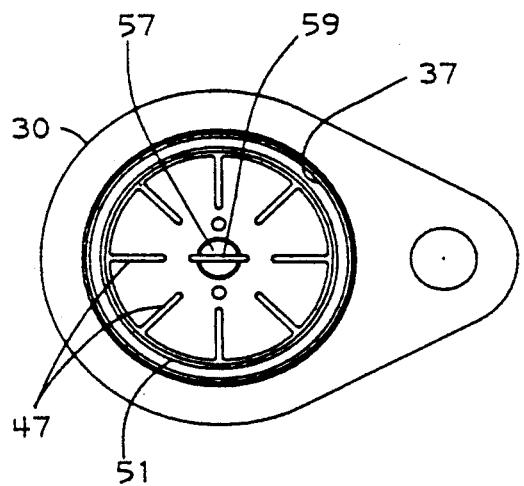
FIG. 9 is an enlarged plan view of the upper surface (as seen in FIG. 2) of the bottom housing.
Figure 10:
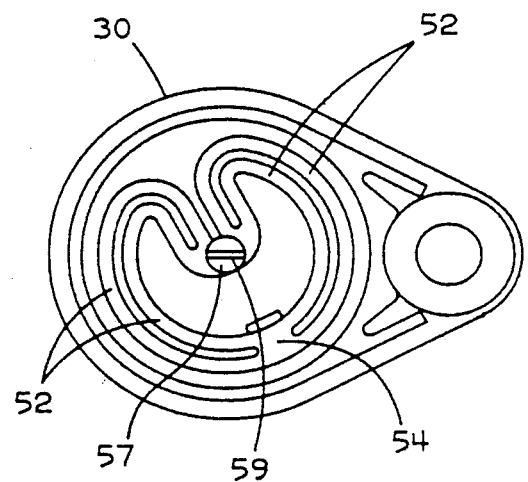
FIG. 10 is an enlarged plan view of the bottom housing surface opposite the surface as shown in FIG. 9.

As shown FIGS. 3 and 7 and the enlarged top and bottom views of FIGS. 9 and 10, on the lower surface of bottom housing 20 which is obscured in Fig.2, four channels 52 extend from the central opening 57 to the other common terminal location 54 that underlies the notch 55 in the bottom cover 39 to communicate with the interior of the disk drive enclosure.

The filter elements 31, 32, 33, 34 are captured between the diffusion plate 36 and the bottom housing 30 which are ultrasonically welded together. The bottom cover 39 is ultrasonically welded to the bottom housing 30. Thus the rigid parts of the assembly 24 are secured to one another without fastening devices or adhesives that that could cause or be the source of contaminant particles. The provision of multiple diffusion limiting paths 40 and 50 respectively positioned at each side of the filter medium 35 not only make the filter more effective and prevent flooding the filter with atmospheric components that do not actually pass through the filter, but also makes the filter assembly less sensitive to contamination during manufacture and handling and makes less necessary special precautions or a protective environment prior to assembly to the disk drive.

The filter includes HEPA filter media 31, 32 disposed at each axial side of the chemical filter media. The intermediate chemical filter media includes a medium 34 containing activated carbon to trap undesired organic vapors. This function is best provided by the activated carbon filter fabric material, previously described, that can provide protection against organic vapors with an approximate thickness of 0.5 mm and affording minimal restriction to air flow. A second chemical element 33 can be used to trap inorganic gasses. An alternative is to provide the inorganic filter capability by treating the prefilter 31 to also trap the inorganic pollutant gases.

In operation, with the filter assembly 24 secured by the external tape 25, to the disk drive cover opening, air from the outside enters at the central opening 41 of the diffusion plate 36. After passing through the diffusion passages 40, air enters the chamber 45 through the openings 42 adjoining the periphery of the chamber. At the opposite side of the combined filter medium 31 air exits from the chamber at the center opening 57. Thus the passage through the filter assembly is of substantially equal length irrespective of the portion of the filter that is traversed. Whereas the particulate filter may be self adjusting in seeking other paths through the filter if a portion of the filter becomes obstructed by particles, the chemical filter may be "blown out" or the chemical filtering capability degraded or totally consumed in a localized portion without using the capability in other portions of the filter. The chemical filter does not become obstructed as the chemical filtering capability is depleted and is therefore not self compensating. Hence, by using a flow geometry that has equal length flow passages the active area of the chemical filter can be effectively utilized.

What is claimed is:

1. A chemical filter system for excluding pollutants from an electronic equipment enclosure comprising
an opening through a wall of said enclosure;
a housing mounted in said opening and sealed to said wall;
a multiple layer filter medium supported within said housing;
said multiple layer filter medium including a particle prefilter layer, a particulate final filter layer and a chemical filter layer, including an organic filter element and an inorganic filter element; and
said housing enclosing said filter medium and including diffusion limiting passage means extending from opposite sides of said filter medium respectively to the exterior and the interior of said enclosure.

2. The chemical filter system of claim 1 further comprising
first and second chambers respectively disposed at opposite sides of said filter medium and respectively connected to said diffusion passage means, one of said diffusion passage means connected to a plurality of openings adjoining the periphery of the associated chamber and the other of said diffusion passage means connected to the other chamber at the center thereof, whereby the length of the pathway of air through the filter system is substantially equal irrespective of the portion of the filter medium traversed.

3. The chemical filter system of claim 2 wherein parts thereof exposed to the interior of the enclosure are bonded by ultrasonic welding to exclude adhesives and attachment devices from said enclosure.

4. The chemical filter system of claim 3 wherein each of said diffusion passage means comprises a plurality of passageways that afford alternate pathways whereby interruption of flow through any passageway does not block air flow through said filter system.

5. The chemical filter system of claim 4 wherein each of the pluralities of passageways that form a diffusion passage means are coplanar and substantially parallel to the filter medium to minimize the overall height of the filter system.

6. The chemical filter system of claim 5 wherein said electronic equipment enclosure comprises the head-disk enclosure of a magnetic disk data storage unit.

7. The chemical filter system of claim 6 wherein said head-disk enclosure includes a cover element and surrounds a plurality of magnetic disks mounted to rotate in unison about a common axis and said enclosure opening is formed in said cover element adjacent the surface of a disk positioned at one axial end of said plurality of disks.

8. The chemical filter system of claim 2 wherein said organic filter element comprises a fabril filter material which is comprised of activated carbon and has a low resistance to air flow.

9. A chemical filter system for excluding pollutants from an electronic equipment enclosure comprising
an opening through a wall forming said enclosure;
a housing mounted in said opening and sealed to said wall;
a multiple layer filter medium enclosed by said housing and positioned to be in the path of all air entering or exiting said enclosure through said opening;
said multiple layer filter medium including a particulate prefilter layer, a particulate final filter layer and an intermediate chemical filter layer;
a first extended length diffusion passage means extending from the exterior of said enclosure to said prefilter; and
a second extended length diffusion passage means extending from said final filter to the interior of said enclosure.

10. The chemical filter system of claim 9 wherein said chemical filter layer comprises activated carbon.

11. The chemical filter system of claim 10 wherein said chemical filter layer comprises a fabric which contains activated carbon and has a low flow resistance.

12. The chemical filter system of claim 10 wherein said filter medium includes means for trapping both organic and inorganic chemical components.

13. The chemical filter system of claim 12 wherein one of said particulate filter layers is treated to enable capture of inorganic gaseous pollutants.

14. The chemical filter system of claim 9 further comprising a first chamber adjacent said prefilter to which said first extended length diffusion passage means connects and a second chamber adjacent said final filter to which said second extended length diffusion passage means is connected.

15. The chemical filter system of claim 14 wherein one of said extended length diffusion passage means communicates with the associated chamber at multiple locations adjacent the periphery of the adjoining particulate filter layer and the other of said extended length diffusion passage means communicates with the associated chamber adjacent the center of the adjoining particulate filter layer.

16. The chemical filter system of claim 15 wherein each of said extended length diffusion passage means comprises a plurality of passageways that afford parallel air flow.

17. The chemical filter system of claim 16 wherein each of said diffusion passage means is formed of a plurality of substantially coplanar passageways.

18. The chemical filter system of claim 17 wherein said electronic equipment enclosure comprises a head-disk enclosure of a magnetic disk storage device.

19. The chemical filter system of claim 18 wherein said head-disk enclosure comprisies a bas and a cover with said filter medium mounted at a passage through said cover and adjacent the surface of a storage disk within said head-disk enclosure.

20. A chemical filter system for excluding pollutants from a head disk enclosure of a magnetic disk data storage device comprising
an opening through a wall forming said enclosure;
a housing carried by said enclosure wall at said opening and sealed to said wall;
a multiple layer filter medium enclosed within said housing and positioned to be in the path of all air entering or exiting through said opening;
said multiple layer filter medium including a chemical filter means for entrapping organic chemical vapors;
a first extended length diffusion passage means extending from the exterior of said enclosure to one side of said filter medium; and
a second extended length diffusion passage means extending from the side of said filter medium opposite said one side to the interior of said enclosure.

21. The chemical filter system of claim 20 wherein said multiple layer filter means further comprises a particulate filter in series with said chemical filter means.

22. The chemical filter system of claim 21 wherein said chemical filter means comprises activated carbon.

23. A chemical filter system for excluding pollutants from an electronic equipment enclosure comprising
an opening through a wall forming said enclosure;
a housing carried by said enclosure at said opening;
a multiple layer filter medium enclosed within said housing and positioned to be in the path of all air entering through said opening;
said multiple layer filter medium including a particulate filter and a chemical filter means for entrapping organic chemical vapors;
a first extended length diffusion passage means extending from the exterior of said enclosure to adjacent one side of said filter medium;

a second extended length diffusion passage means extending from the side of said filter medium opposite said one side to the interior of said enclosure;

a first chamber adjacent said one side of said filter medium to which said first extended length diffusion passage means connects; and a second chamber adjacent the side of said filter medium opposite said one side to which said second extended length diffusion passage mans is connected;

one of said first and second extended length diffusion passage means communicating with the associated chamber at multiple locations adjacent the periphery of the adjoining filter medium and the other of said first and second extended length diffusion passage means communicating with the associated chamber adjacent the center of the adjoining filter medium.

24. The chemical filter system of claim 23 further comprising a wall portion which defines the chamber to which is connected to the other of said first and second diffusion passage means;

a central opening in said wall portion through which said other of said first and second diffusion passage means communicates with the chamber; and a bridge structure connected at its end to said wall portion and extending across the central opening to maintain said filter medium away from the outlet of said other of said first and second diffusion passage means.

* * * * *